(12) United States Patent
Chien et al.

(10) Patent No.: US 11,221,538 B2
(45) Date of Patent: Jan. 11, 2022

(54) ACHROMATIC LIQUID CRYSTAL LENS WITH A CHIRAL NEMATIC LIQUID CRYSTAL

(71) Applicant: Kent State University, Kent, OH (US)

(72) Inventors: Liang-Chy Chien, Hudson, OH (US); Kai-Han Chang, Kent, OH (US); Andrii Varanytsia, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 16/612,149

(22) PCT Filed: May 18, 2018

(86) PCT No.: PCT/US2018/033459
§ 371 (c)(1),
(2) Date: Nov. 8, 2019

(87) PCT Pub. No.: WO2018/213750
PCT Pub. Date: Nov. 22, 2018

(65) Prior Publication Data
US 2021/0080800 A1 Mar. 18, 2021

Related U.S. Application Data

(60) Provisional application No. 62/508,611, filed on May 19, 2017.

(51) Int. Cl.
*G02F 1/29* (2006.01)
(52) U.S. Cl.
CPC ................ *G02F 1/29* (2013.01); *G02F 1/294* (2021.01)

(58) Field of Classification Search
CPC .................................. G02F 1/29; G02F 1/294
See application file for complete search history.

(56) References Cited

U.S. PATENT DOCUMENTS

| 5,477,358 A | 12/1995 | Rosenblatt et al. |
| 2014/0028924 A1* | 1/2014 | Yamaguchi .......... G03B 17/565 349/1 |

(Continued)

FOREIGN PATENT DOCUMENTS

EP 2682812 1/2014

OTHER PUBLICATIONS

Hassanfiroorzi, Amir et al., Dual layer electrode liquid crystal lens for 2D/3D tunable endoscopy imaging system, Optical Society of America, Apr. 11, 2016, pp. 8527-8538.

(Continued)

*Primary Examiner* — Jessica M Merlin
(74) *Attorney, Agent, or Firm* — Hahn Loeser + Parks LLP; Scott M. Oldham, Esq.

(57) ABSTRACT

Liquid crystal lenses of different apertures with suppressed chromatic aberration utilizing twisted vertical alignment configuration are demonstrated. A plurality of substrates are provided with electrodes, including a patterned electrode to generate a lens effect. The liquid crystal material is homeotropically aligned, such as via alignment layers. Setting the ratio between cell thickness and chiral pitch of the cholesteric liquid crystals provides correction of axial chromatic aberrations of electrically-tunable focal lengths in the device.

20 Claims, 6 Drawing Sheets

(56) References Cited

U.S. PATENT DOCUMENTS

| | | | |
|---|---|---|---|
| 2014/0132904 A1* | 5/2014 | Bos | G02F 1/134309 |
| | | | 349/139 |
| 2016/0070132 A1* | 3/2016 | Soto | G02F 1/13476 |
| | | | 349/193 |
| 2016/0274423 A1* | 9/2016 | Kashiwagi | H04N 13/356 |
| 2018/0031947 A1* | 2/2018 | Shibuya | H04N 5/23258 |
| 2018/0239177 A1* | 8/2018 | Oh | G02B 6/0055 |

OTHER PUBLICATIONS

United States Patent and Trademark Office, International Search Report/Written Opinion, International Application No. PCT/US18/33459, dated Aug. 10, 2018, 8 pages, Alexandria, VA U.S.A.

Yi-Chin Fang et al., Eliminating chromatic aberration in Gauss-type lens design using a novel genetic algorithm, Applied Optics, 2007, pp. 2401-2410, vol. 46, Issue 13.

A. Miks et al., Superachromatic air-spaced triplet, Applied Optics, 2014, pp. 6930-6937, vol. 53, Issue 29.

F. Aieta et al., Multiwavelength achromatic metasurfaces by dispersive phase compensation, Science, 2015, pp. 1342-1345, vol. 347, Issue 6228.

P. Wang et al., Chromatic-aberration-corrected diffractive lenses for ultra-broadband focusing, Scientific Reports 6, 2016, 7 pages, Article No. 21545.

A. Hassanfiroozi et al., Hexagonal liquid crystal lens array for 3D endoscopy, Optics Express, 2015, pp. 971-981, vol. 23.

Yi Pai Huang et al., Individually Adapted LC-lens Array for 3D Applications, Molecular Crystals and Liquid Crystals, 2014, pp. 267-274, vol. 605.

Yi Lin et al., Electrically tunable-focusing and polarizer-free liquid crystal lenses for ophthalmic applications, Optics Express, 2013, pp. 9428-9436, vol. 21.

H.C. Lin et al., An Electrically Tunable Focusing Pico-Projector Adopting a Liquid Crystal Lens, Japanese Journal of Applied Physics, Part 1, 2010, vol. 49, No. 10R.

Y.H. Lin et al., Electrically-tunable optical zoom system by using liquid crystal lenses, SPIE 8280, 2012.

K. A. Crandall et al., Vanishing Freedericksz transition threshold voltage in a chiral nematic liquid crystal, 1994, Applied Physics Letters, pp. 1741-1743, vol. 64.

B. Wang et al., Liquid crystal lens with focal length variable from negative to positive values, 2006, IEEE Photonics Technology Letter, pp. 79-81, vol. 18.

K.H. Chang et al., 73-4L: Late-News Paper: Wavelength-independent Electrically Tunable Microlens Array with a Chiral Nematic Liquid Crystal, SID Symposium Digest of Technical Papers, 2017, pp. 1077-1080, vol. 48.

H. Ren et al., Liquid crystal lens with large focal length tunability and low operating voltage, Optics Express, 2007, pp. 11328-11335, vol. 15.

K.H. Chang et al., Fast-switching chiral nematic liquid-crystal mode with polymer-sustained twisted vertical alignment, Physical Review E, 95, 042701.

* cited by examiner

ACHROMATIC LIQUID CRYSTAL LENS WITH A CHIRAL NEMATIC LIQUID CRYSTAL

CROSS REFERENCE TO RELATED APPLICATION

This application is a national phase application of PCT International Application No. PCT/US18/33459, filed May 18, 2018, which claims priority to and the benefit of U.S. Provisional Patent Application Ser. No. 62/508,611, filed on May 19, 2017, which are incorporated herein by reference in their entirety.

TECHNICAL FIELD

The invention is related to the development of an electrically tunable liquid crystal lens or other optical device, with self-corrected aberration.

BACKGROUND OF THE INVENTION

Tunable lenses have been developed for use in compact optical systems. Liquid crystal has been used to pursue tunable lenses owing to its optical anisotropy and electrically-tunable orientation. Numerous LC lens and liquid crystal microlens arrays have been developed for applications such as 3D imaging and sensing system construction, electrically switchable 2D/3D modes, ophthalmic applications, picoprojectors, and optical zoom systems. The focal length of the reported LC lenses and LC microlens arrays (LCMLA) are measured at a single wavelength. With the wavelength dispersion of LC material, the focal length of a nematic LC lens/LCMLA depends on the wavelength of light. For full color imaging, a wavelength-independent tunable focal length is desired.

Microarrays are widely used in applications such as digital projectors, imaging and sensor systems, beam homogenizing and shaping, fiber coupling and light-field microscopy as examples.

In the foregoing, issues in relation to axial chromatic aberrations exist, and it would be desirable to suppress such aberrations and provide a LCD device that improves the imaging quality of the electrically-tunable liquid crystal lenses. Other improvements in LCD lenses will also provide enhanced devices and performance.

SUMMARY OF THE INVENTION

It is therefore an aspect of this invention to provide a liquid crystal device with at least one first and one second substrate that are spaced apart from one another a predetermined distance, and each of the upper and lower substrates having inner and outer surfaces. At least a first electrode disposed on a surface of the first substrate, and at least a second electrode disposed on a surface of the second substrate, wherein one of the first or second electrodes is patterned on the substrate. An alignment layer is disposed on the first and second substrates. A layer with high resistivity is disposed in relation to the patterned electrode on the substrate. A liquid crystal is interposed between the substrates, comprising chiral nematic liquid crystal molecules of negative dielectric anisotropy. The at least first and second electrodes are connected to a voltage to drive the liquid crystal molecules between at least first and second states. The alignment layers cause predetermined alignment of the liquid crystal molecules between the first and second substrates without voltage applied. In the devices, operation may cause lens effects, such as positive and negative lens effects, with suppressed chromatic aberrations. The invention may thus be useful for achromatic liquid crystal devices, including lens devices designed to reduce color errors and transmit the light without decomposing it spectrally. The devices and methods are designed to limit the effects of chromatic and spherical aberration, and are corrected to bring two wavelengths into focus on the same plane.

The devices and methods may use a liquid crystal lens cell comprising a plurality of substrates, with at least a first substrate spaced apart from a second substrate. Patterned electrodes disposed upon a substrate are used to generate a predetermined electric field across the cell. In an example, a parabolic electric field may be produced for producing a lens effect. A chiral nematic liquid crystal is interposed between the first and second substrate. In an example, a third substrate is provided for dual switching of a microlens array formed of the cell or cells.

A further aspect of the invention relates to producing achromatic behavior from a lens device or microlens array which is electrically-tunable. The property of a long pitch chiral nematic liquid crystals in conjunction with the cell configuration provides suppressed axial chromatic aberration, being achieved by the proper ratio between liquid crystal cell thickness and chiral pitch of chiral nematic or cholesteric liquid crystal material to improve the imaging quality of the electrically-tunable liquid crystal lens devices.

BRIEF DESCRIPTION OF THE DRAWINGS

These and other features and advantages of the invention will become better understood with regard to the following description, appended claims and accompanying drawings wherein:

FIG. 1 shows schematic illustrations of am example TVA lens at field-off state in FIG. 1a and showing a negative TVA lens if FIG. 1b and a positive TVA lens in FIG. 1c.

FIG. 2 is the schematic illustration of an example microlens array according to an example, wherein

FIG. 3 shows the phase profiles of the microlens array of FIG. 2 at different applied voltages, wherein

FIG. 4a is a graph of focal length as a function of applied voltage measured at different wavelengths, indicating an electrically-tunable focal length, while

FIG. 5 is a schematic illustration of a dual-switching liquid crystal microlens array configuration; with FIG. 5a showing the field-off state, FIG. 5b showing a negative TVA lens ($V_1 > V_2$), and FIG. 5c showing a positive TVA lens ($V_2 > V_1$).

FIG. 6 shows images of phase profiles of positive and negative lens effects for a device example of FIG. 5, wherein phase positive profiles when ($V_1 = 0V$): FIG. 6a: $V_2 = 10V$; FIG. 6b: $V_2 = 12V$, FIG. 6c: $V_2 = 14V$, FIG. 6d: $V_2 = 16V$, FIG. 6e: $V_2 = 18V$, and phase profile of negative lens ($V_2 = 0V$): FIG. 6f: $V_1 = 10V$; FIG. 6g: $V_1 = 12V$; FIG. 6h: $V_1 = 14V$, FIG. 6i: $V_1 = 16V$; and FIG. 6j: $V_1 = 18V$.

FIG. 8 shows imaging of FIG. 8a positive lens, off state ($V_1$=0, $V_2$=0), FIG. 8b positive lens, on state ($V_1$=0V, $V_2$=14V), FIG. 8c negative lens, off state ($V_1$=0, $V_2$=0), and FIG. 8d negative lens, on state ($V_1$=18V, $V_2$=0V).

FIG. 10 shows images of the example device of FIG. 9, showing positive lens phase profiles ($V_{in}$=40V): FIG. 10a $V_{out}$=30V, FIG. 10b $V_{out}$=20V, FIG. 10c $V_{out}$=10V; and negative lens phase profile ($V_{out}$=40V): FIG. 10d $V_{in}$=30V, FIG. 10e $V_{in}$=20V, FIG. 10f $V_{in}$=16V.

FIGS. 12a-12d show positive and negative lens effects, wherein

DETAILED DESCRIPTION OF THE INVENTION

With reference to the Figs., various examples of optical devices according to the invention are shown and characterized. The devices may provide switchable lens devices, using low-voltage operation and which are wavelength-independent. The devices and methods may be used in applications such as digital projection or projectors, including full-color 3D projection for virtual reality (VR) applications, microscopy, endoscopy or pico projection and various other applications. Additional applications include digital/optical zoom lenses, 3D or other imaging and sensor systems, electrically switchable 2D/3D mode projection or imaging, beam steering, homogenizing or shaping, fiber coupling, light-field microscopy and many other applications. As an example, the invention provides a liquid crystal microlens array (LCMLA) using a chiral nematic liquid crystal material in a twisted vertical alignment configuration, which operates (switches between states) at low-voltage and which is wavelength-independent has an electrically tunable focal length. The devices and methods also provide suppressed wavelength dispersion in the display, imaging, ophthalmic, endoscopic or other type of device, to minimize color or other distortions.

Turning to FIG. 1, an example of the invention provides a LC lens cell 10 that comprises at least one first and second substrates 12, with at least one first substrate 12 having patterned electrodes 14. The at least first and second substrates are planar or may be curved in the examples of the invention, and are at least partially light transparent. Electrodes are at least partially light transparent.

The electrodes 14 may be at least partially light transparent, and as an example comprise of a transparent conductive oxide layer and may be lithographically processed with the desired pattern for microlens arrays, lens with a larger aperture or with other characteristics for various applications. The cell gap is controlled with a film or the like, such as a 50 μm mylar film. The ratio between the cell thickness (d) and pitch (p) of the chiral liquid crystal (d/p) is controlled, and in this example, is at about 0.5±0.05.

Figures 1A, 1B:
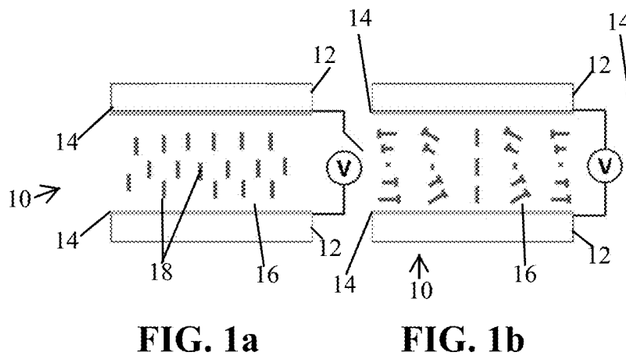
Figure 1C:
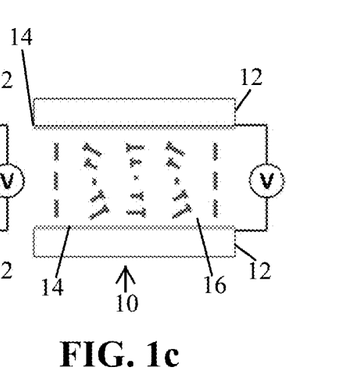

The LC lens cell 10 in this example comprises two substrates 12 with patterned conductive electrodes 14, and treated vertical alignment layers 16, such as polyimide (VA-PI in FIG. 1), SE-1211(Nissan Chemical) with a ~20 nm thick deposit on the surface of the substrates, that are used to align the liquid crystals 18, as shown in FIG. 1a. The alignment layers 16 may be rubbed with a velvet cloth in a uniaxial direction, printed, or otherwise treated, and the rubbing directions of the top and bottom substrates are aligned in an anti-parallel configuration. The LC material 18 in this example, is a chiral nematic mixture, and comprises a negative dielectric anisotropy nematic liquid crystal and chiral dopant. The mixture is deposited into the liquid crystal lens cell 10 via a capillary force action or other suitable technique. A schematic illustration of the operation of the TVA mode liquid crystal lens is shown in FIG. 1. In FIG. 1a, the schematic liquid crystal molecules 18, at zero voltage, are aligned perpendicular to the substrates 12, and the focal length of the LC lens 10 is infinity. If the electric field is applied to the lens 10, and it is weaker in the center than at the edge of the lens, in this case, the LC lens has a negative focusing power, as shown in FIG. 1b. By contrast, if the electric field at the center of the lens is stronger than that at the edge of the lens, the LC lens 10 has a positive focusing power, as shown in FIG. 1c.

Example 1

Figure 2A:
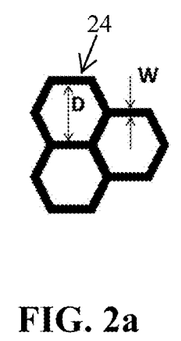
FIG. 2a shows a hexagonal microlens array electrode structure.
Figure 2B:
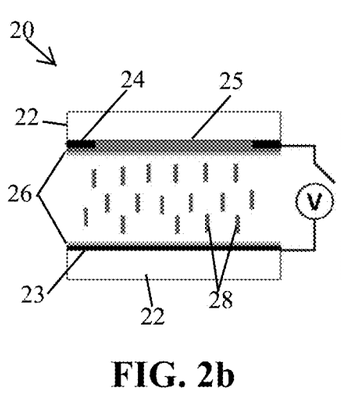
FIG. 2b shows a schematic of side view of a single unit cell of a TVA microlens array without voltage applied and FIG. 2c shows the cell with voltage applied.
Figure 2C:
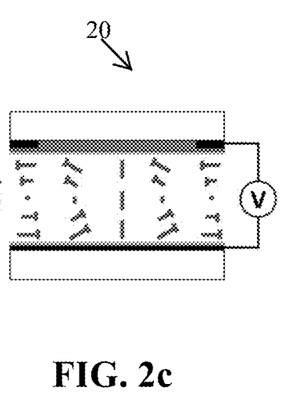

With reference to FIG. 2, there is shown a device 20, such as TVA-mode microlens array (MLA), to control both the aperture and shutter speed for example. The aperture of the liquid crystal lens 20 according to the invention can be ranged from pico or microlens scale to ophthalmic application scale for example. In this example, first and second substrates 22 are provided, with a first substrate 22 provided with a counter or ground electrode 23 and the other substrate 22 provided with a hexagonal-shaped electrode 24. The hexagonal-shaped electrode pattern may provide the advantage of a high fill factor. The at least partially transparent conductive electrodes 23 and 24 used in fabrication of this MLA 10 may be indium tin oxide (ITO), but any other suitable material may be used. The diameter (D) of the electrode space of the lens diameter (D) in this example is 353 μm and the electrode width (W) is 15 μm as shown in FIG. 2a. After patterning the electrode 24 with a hexagonal microlens array structure, a resistive material 25 is provided to insulate the electrode pattern. For example, a diluted solution of conductive polymer (CP) Poly(3,4-ethylenedioxythiophene)-poly(styrenesulfonate) (PEDOT: PSS) (0.33 wt % (CP: DI-water=1:2 weight ratio diluted from 1.0 wt % PEDOT:PSS) in $H_2O$, high conductivity grade, Sigma-Aldrich), is spin-coated onto the patterned electrode 24 to act as a high resistance layer 25 between the electrodes of the pattern on substrate 22 as shown in FIG. 2b. The purpose of the high resistance coating is to generate an electric field at center of the lens in this example. After the CP coating, both the top substrate 22 with the patterned electrode 24 and bottom substrate 22 with ground electrode 23 are coated with vertical alignment layer 26, such as polyimide (VA-PI), and rubbed to provide a homeotropic alignment of the liquid crystal molecules, as shown in FIG. 2b. The alignment layers 26 on the top and bottom substrates 22 may be assembled in an anti-parallel fashion, such as via the rubbing directions or other suitable treatment of the alignment layers 26. The vertical alignment layers 26 are treated to provide anisotropy and small pretilt angle in the liquid crystal material at field off state, such as below three degrees. The pretilt state of the liquid crystal molecules at the substrate boundaries is determined by the rubbing or other alignment process. The substrates 12 may be separated by mylar films (not shown) to control the cell gap, such as at 53±2 µm. A chiral nematic liquid crystal mixture 18 consisting of a negative anisotropy liquid crystal materials HNG 715600-100 (99.83 wt %, Δn=0.153, Δε=−12.2, $T_{NI}$=87.9° C., HCCH, China) and chiral dopant CB-15 (0.17 wt %, Merck) is prepared to give a pitch of the chiral nematic liquid crystal mixture at 100±4 µm. The purpose of controlling the ratio between cell gap and pitch of the chiral nematic (d/p) to be ~0.5 is to have the maximum phase difference between center and edge of the lens in response to an applied voltage, and to ensure the output polarization state is closed to the input linear polarization direction. The demonstrated microlens array in this example has a negative focal length with the proposed electrode structure. FIG. 2c shows the schematic of side view of a single unit in TVA the microlens array with voltage applied.

Figure 3A:
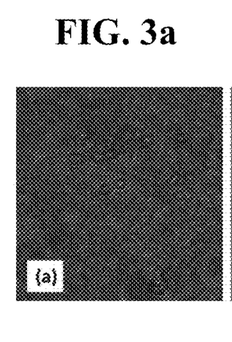
FIG. 3a is at 0V.
Figure 3B:
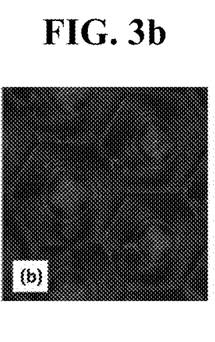
FIG. 3b is at 3V.
Figure 3C:
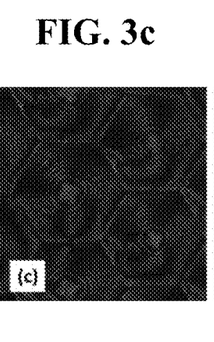
FIG. 3c is at 4V.
Figure 3D:
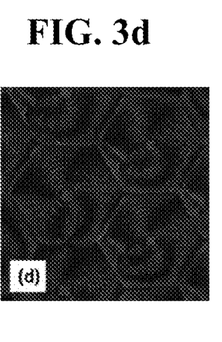
FIG. 3d is at 5V.

The focal length of the MLA 20 of this example is measured by obtaining the phase profile of the lens. A liquid crystal MLA 20 is placed between a pair of parallel polarizers with the rubbing direction perpendicular to the transmission axis of the polarizers. An objective lens with 20× magnification is placed behind microlens array to magnify the lens profile for analysis. A magnified voltage-dependent lens profile of the MLA taken at 514 nm is projected onto a screen as shown in FIG. 3. The diameter of the microlens array is used as a scaling parameter for lens profile analysis. To examine the wavelength-dependency of the focal length, both HeNe laser with an emission wavelength of 633 nm and Argon laser with emission wavelengths of 514 nm and 488 nm are used. In FIG. 3a, no voltage is applied, while successive voltages of 3v, 4V, and 5V are applied in FIGS. 3b, 3c and 3d respectively.

The optical phase difference (OPD) between the center of the lens 20 and distance r with respect to the center of the lens 20 can be measured through phase retardation obtained from phase profiles. The focal length (f) of the microlens array 20 can be calculated by fitting the parabolic phase profile with the equation $$OPD(r) \approx -\frac{r^2}{2f}.$$

Figure 4A:
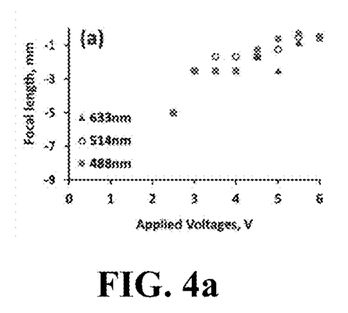
Figure 4B:
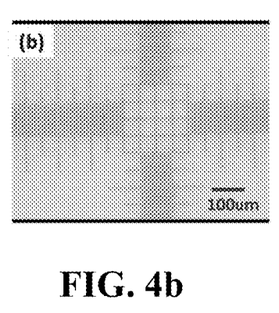
FIGS. 4b and 4c show images of a microlens array of the example of FIG. 2 at different applied voltages under microscope, being 0V and 5V respectively.
Figure 4C:
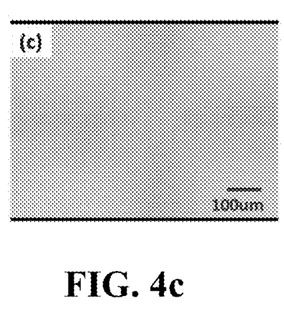

The measured focal lengths as a function of applied voltage, as is presented in FIG. 4a. The focal length tunable range of the MLA 20 of this example is from −5 mm to 0.8 mm with a driving voltage less than 6V. The ability to drive the lens 20 with low voltage provides a device that is effective and efficient. The voltage-dependent focal length curves of different wavelengths are found to overlap. This result confirms that the microlens array has a wavelength-independent of electrically tunable focal length property. The image profile from a MLA is taken under a microscope with 10× magnification as shown in FIGS. 4b and 4c. The MLA is positioned in contact with the grid. At 0V, as shown in FIG. 4b, the MLA has no lens effect. With applied voltage of 5V, the MLA exhibits a negative lens effect and appears with a shrunken image as shown in FIG. 4c.

Example 2

Figure 5A:
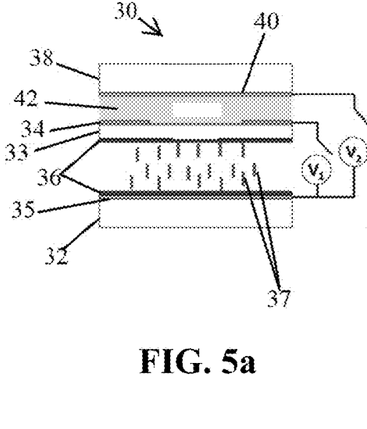
Figure 5B:
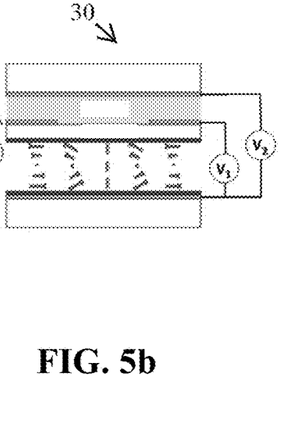
Figure 5C:
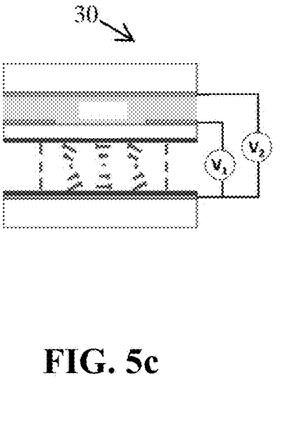

In another example of the invention as shown in FIG. 5, a MLA lens 30 with a positive focal length tuning can be achieved using a multi-layer electrode structure with a long-pitch chiral negative nematic liquid crystals and homeotropic alignment layers. In this example, a three-layered electrode structure is used to fabricate a lens with both positive and negative lens effects in the MLA 30. A first substrate 32, such as 100 µm-thick glass substrate, has an inner and outer surface, and an electrode layer 35, such as of ITO sputtered on the inner surface. A second substrate 33 has an electrode 34 provided thereon, and in this example, the electrode layer 34 is patterned on substrate 33 on the outer surface, with the structure such as shown in FIG. 2a, using a lithographic method. The substrate 33 is thus formed with a hexagonal microlens array pattern, but any pattern may be used to achieve the desired lens effect. In this example, the substrate 33 is also coated with an alignment layer 36, such as a VA-PI layer, on the opposite side of the patterned electrode 34, or inner side of substrate 33. Substrate 32 also includes an alignment layer 36 on top of the electrode layer 35. In this example, the liquid crystal cell 30 has the liquid crystal material 37 between the two substrates 32 and 33, with the top or second substrate 33 being a 100 µm-thick glass substrate with a pre-treatment of patterned electrode 34 and alignment layer 36, and the bottom or first substrate 32 being a glass sputtered with an ITO electrode 35 and coated with VA-PI alignment layer 36 on top of the ITO electrode layer 35. The alignment layers 36 on both substrates 32 and 33 may again be aligned in an anti-parallel fashion, such as with respect to the rubbing directions. The vertical alignment layers 36 are treated to provide anisotropy and small pretilt angle in the liquid crystal material 37. The liquid crystal MLA cell 30 thickness is controlled with a film or other suitable system, such as a 50 µm mylar film. The liquid crystal material 37 may be a chiral nematic liquid crystal, such as a mixture of negative liquid crystal materials HNG 715600-100 (Δn=0.153, Δε=−12.2, $T_{NI}$=87.9° C., HCCH, China) and chiral dopant CB-15 (Merck), which is filled into the gap between substrates 22 and 23. The ratio between the liquid crystal MLA cell gap or thickness and pitch of the chiral nematic liquid crystal 37 is controlled, such as at between 0.4 to 0.6 µm or about 0.5±0.05 µm. In this example, at least one further substrate 38, such as a glass substrate, is also provided with an electrode 40, such as being sputtered with an ITO electrode. The substrate 38 does not have a surface alignment layer, but is provided to allow achieving both positive and negative operation when assembled with the liquid crystal cell 30. The further substrate 38 may be assembled to the cell 30 using an optical layer 42, to provide a predetermined separation from substrate 33. In this example, as suitable optical layer may be an optical adhesive such as NOA81 (Norland Product). The thickness of the adhesive or other layer may be between 1 µm to a thickness as may be useful for a given application. In this example, the thickness may be larger than 10 µm (i.e., 38 µm in this example). The optical layer 42 may provide index matching to reduce reflections at the interface or for a variety of other purposes to produce a desired optical effect. In this example, FIGS. 5a-5c show the Field-off state (FIG. 5a), negative TVA lens ($V_1 > V_2$) (FIG. 5b), and positive TVA lens ($V_2 > V_1$) (FIG. 5c). For obtaining optimal lens effect, the thickness of the patterned ITO glass substrate 33 is chosen to be one-third of the aperture of the lens 30. The thickness of the other two glass substrates 32 and 38 can vary. When $V_1=V_2=9V$, the liquid crystal molecules are in vertically aligned condition because of the liquid crystal material providing the homeotropic alignment in conjunction with the alignment layers, as illustrated in FIG. 5a. With $V_1>V_2$ as shown in FIG. 5b, the electric field at the edge is stronger than that at the center, creating an optical phase difference (OPD) between the two regions and hence induces a negative lens effect. With $V_2>V_1$ as shown in FIG. 5c, the electric field at the edge is weaker than that at the center, creating an OPD between the two regions and hence induces a positive lens effect.

Figure 6A:
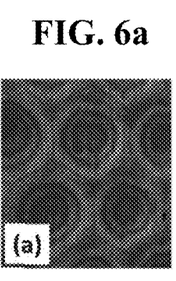
Figure 6B:
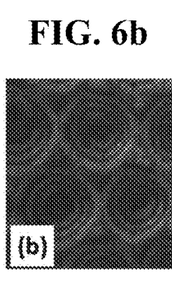
Figure 6C:
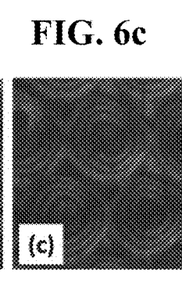
Figure 6D:
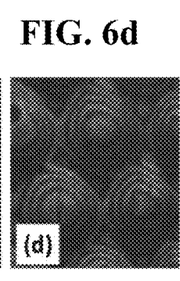
Figure 6E:
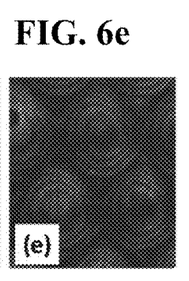
Figure 6F:
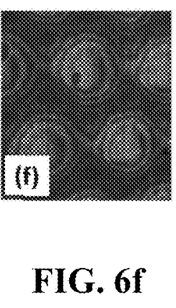
Figure 6G:
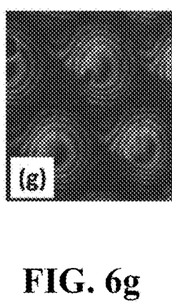
Figure 6H:
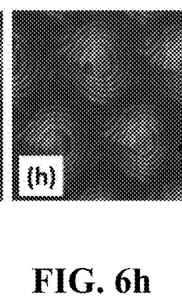
Figure 6I:
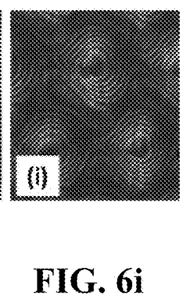
Figure 6J:
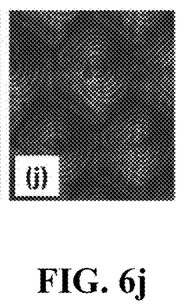

The focal length of a microlens array 30 with dual switching ability in this example is measured by obtaining the lens profile using the same method described in Example 1. The phase profiles of a dual-switching MLA 30 taken at 514 nm is presented in FIG. 6, where FIG. 6a (($V_1$=0V): $V_2$=10V), FIG. 6b (($V_1$=0V): $V_2$=12V), FIG. 6c (($V_1$=0V): $V_2$=14V), FIG. 6d (($V_1$=0V): $V_2$=16V) and FIG. 6e (($V_1$=0V): $V_2$=18V), are the positive lens profiles, and FIGS. 6f-6j showing the negative lens profiles for ($V_2$=0V): (f) $V_1$=10V (g) $V_1$=12V, (h) $V_1$=14V, (i) $V_1$=16V, (j) $V_1$=18V.

Figure 7:
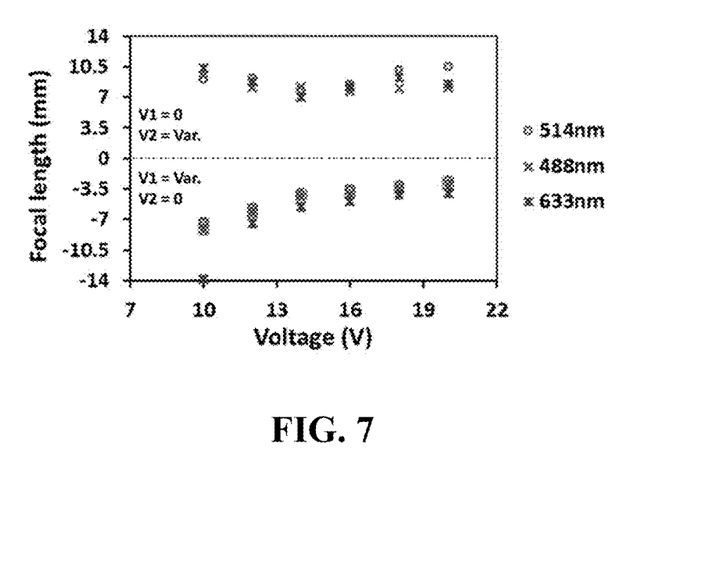
FIG. 7 shows a graph of focal length as a function of applied voltage measured at different wavelengths, indicating an electrically-tunable focal length. In the graph, the upper half: $V_1$ is fixed at 0V with varying $V_2$ for positive lens operation, and the lower half: $V_2$ is fixed at 40V with varying $V_1$ for negative lens operation.
Figure 8A:
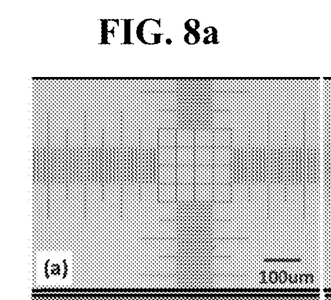
Figure 8B:
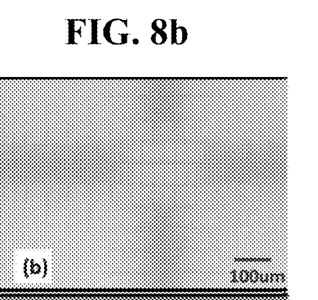
Figure 8C:
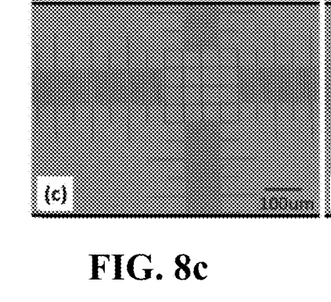
Figure 8D:
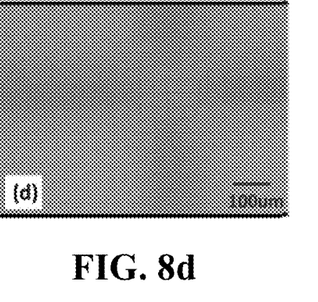

The electrically tunable focal length of a dual-switching MLA 30 as a function of applied voltages measured at different wavelengths is presented in FIG. 7. The upper half of FIG. 7 is the positive tuning of focal length of the MLA 30 and the lower half of FIG. 7 is the negative tuning of focal length of the MLA 30. The positive lens is operated when $V_1$ is fixed at 0V and $V_2$ is varying. The suppressed wavelength dispersion appears when $V_2$ is from 10V to 16V in this example. The tunable range for positive lens is from about 8.2 mm to 9.5 mm. The negative lens is operated when $V_2$ is fixed at 0V and $V_1$ is varying. The suppressed wavelength dispersion appears when $V_1$ is from about 14V to 20V. The tunable range for negative lens is from −3.1 mm to −6.2 mm. The results validate the suppression of axial chromatic aberration in the dual-switching MLA 30. In the example of FIG. 7, the upper half: $V_1$ is fixed at 0V with varying $V_2$ for positive lens operation, and the lower half: $V_2$ is fixed at 40V with varying $V_1$ for negative lens operation.

The images from a microlens array for positive tuning and negative tuning are taken under a microscope with 10× magnification as shown in FIG. 8. The microlens array 30 is in contact with the grid with the thickness of the glass substrate at 1.1 mm. At $V_1$=0, $V_2$=0 for FIG. 8a for positive lens and FIG. 8c for negative lens effects, the microlens array 30 has no lens effect. For positive lens switching as shown in FIG. 8b, the image is 1.11× magnified because of the object is located at a distance shorter than focal length. In case of negative lens switching as shown in FIG. 8d, the size of the image is 0.71× of original size reduced due to a negative lens effect.

Example 3

The response time of the microlens array can be improved by a surface-localized polymer sustained or stabilized liquid crystal alignment method. A chiral nematic or cholesteric liquid crystal may be mixed with at least one reactive monomer to produce a polymer stabilized twist, vertically aligned structure in the liquid crystal. By doping the chiral nematic mixture with a reactive mesogen at the concentration ranging from about 0.1% to 3 wt %, or a concentration from 0.5% to 2 wt %, and polymerizing the material with a ultra-violet light source for 15 minutes (or the like) after applying low frequency driving voltage (5V, 10 Hz) for 30 minutes (or the like), the total response time can be lowered by 10% to 15%.

Example 4

Figure 9A:
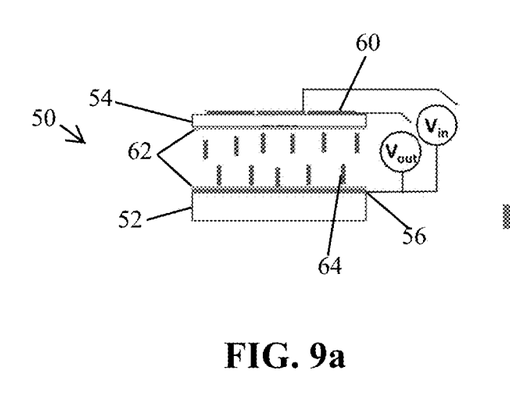
FIG. 9a is a schematic illustration of side view of liquid crystal lens structure at field-off state.
Figure 9B:
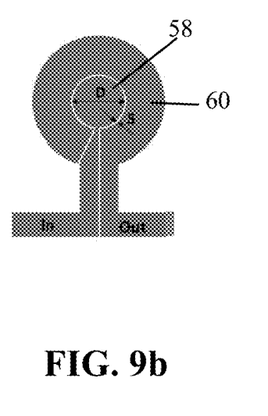
FIG. 9b shows a schematic top view of lens electrode configuration D=2.35 mm, S=50 μm.

In a further example, a large aperture device 50 may be formed according to the invention. For example, a three-electrode liquid crystal lens cell (LCLC) 50 design is shown. The LC lens 50 comprises a plurality of substrates, such as first and second substrates 52 and 54, with both substrates 52 and 54 having an electrode layer or configuration. In this example, the substrate 54 may have an electrode pattern, such as formed of inner and outer electrodes 58 and 60, formed in a pattern as shown in FIG. 9b. The electrode 58 provides an input voltage ($V_{in}$) while electrode 60 provides an output voltage ($V_{out}$). The electrodes 58 and 60 may be ITO sputtered on the substrate 54 using a lithographic or other suitable method. After patterning the electrodes 58 and 60, a diluted solution of conductive polymer or other suitable material to act as a high resistance layer between the electrodes of the top substrate 54. For example, a conductive polymer (CP) Poly(3,4-ethylenedioxythiophene)-poly(styrenesulfonate) (PEDOT: PSS) (0.33 wt % (CP: DI-water=1:2 weight ratio diluted from 1.0 wt % PEDOT:PSS) in $H_2O$, high conductivity grade, Sigma-Aldrich) may be spin-coated onto the patterned electrodes to act as a high resistance layer between the electrodes 58 and 60 of the top substrate 54. In this example, a ground or counter electrode layer 56 is formed on the substrate 52, and may again be a sputtered ITO layer. In this example, the substrate 52 is also coated with an alignment layer 62, such as a VA-PI layer, on the electrode 56, and substrate 54 also includes an alignment layer 62 on its inner surface. In this example, the liquid crystal cell 50 has the liquid crystal material 64 between the two substrates 52 and 54. The alignment layers 62 on both substrates 52 and 54 may again be aligned in an anti-parallel fashion, such as with respect to the rubbing directions. The liquid crystal MLA cell 50 thickness is controlled with a film or other suitable system, such as a 50 µm mylar film.

In this example, the thickness of the substrate 52 with the non-patterned electrode 56 may vary, while the substrate 54 with patterned electrode can be as thin as 100 micrometers to reduce the switching voltage. In this example of a LCLC device 50, the thickness of the top substrate 54 is 0.4 mm, and generates a parabolic electric field in the liquid crystal cell due to the electrode pattern. FIG. 9a shows the liquid crystal lens structure at field-off state. The bottom substrate 52 has VA-PI coated on top of the ITO conductive electrode 56, while the second substrate 54 has VA-PI coated on non-electrode or inner side and the patterned electrode is facing outside of the lens cell 50. The patterned electrode in this example has a diameter D of 2.35 mm and the electrode gap S between inner electrode and outer electrode is 50 µm as shown in FIG. 9b. The thickness of LCLC is controlled at 50 µm with mylar film or the like. The substrate surfaces in direct contact with liquid crystal molecules 64 are coated with the alignment layers 62, which provides for homeotropic alignment of the liquid crystal molecules 64 in the field off state. A chiral nematic liquid crystal mixture 64 in this example may be similar to that used in Example 1 (comprising of a nematic liquid crystal with negative dielectric anisotropy (HNG 715600-100, HCCH, China) and a chiral dopant (CB-15, Merck)). The electric field formed inside the cell 50 is uniform when $V_O$ is equal to $V_{in}$, and therefore the liquid crystal cell is similar to an electrically controllable birefringence (ECB) cell without any lens effect. In operation of the LCLC 50, when the $V_{in}$ is larger than $V_{out}$ ($V_{in}>V_{out}$), the LC lens 50 exhibits a positive lens effect. When the condition of operation is $V_{out}>V_{in}$, the LC lens 50 exhibits a negative lens effect. The driving scheme of this liquid crystal lens is applying both $V_{in}$ and $V_{out}$ with an equally high voltage, which in this example is 40 V, which can eliminate any defects during switching. In an example, for a positive lens, the voltage at $V_{in}$ is fixed at 40V and the voltage at $V_{out}$ is reduced to obtain the desired positive focal length. For a negative lens, the voltage at $V_{out}$ is fixed at 40 V and the voltage at $V_{in}$ is reduced to obtain the target negative focal length.

Figure 10A:
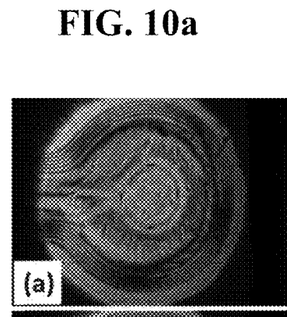
Figure 10B:
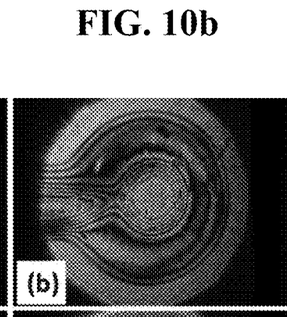
Figure 10C:
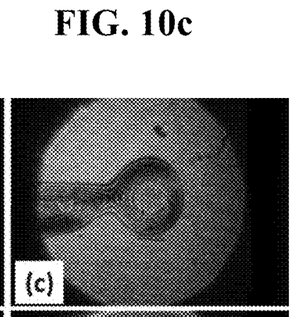
Figure 10D:
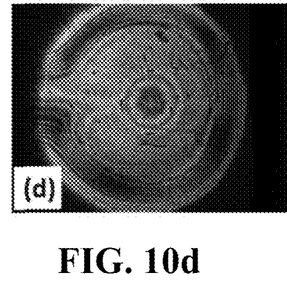
Figure 10E:
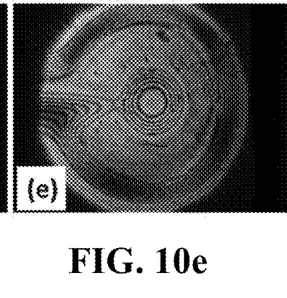
Figure 10F:
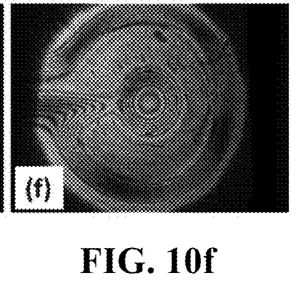

The focal length of the liquid crystal lens 50 with dual switching ability in this example is measured by obtaining the lens profile using the same method described in Example 1 above. The phase profile of dual switching taken at 514 nm is presented in FIG. 10 with FIG. 10a to FIG. 10c being the positive lens profile, and FIG. 10d to FIG. 10f being the negative lens profile. In the positive lens phase profile ($V_{in}$=40V): FIG. 10a $V_{out}$=30V, FIG. 10b $V_{out}$=20V and FIG. 10c $V_{out}$=10V, and for the negative lens phase profile ($V_{out}$=40V): FIG. 10d $V_{in}$=30V, FIG. 10e $V_{in}$=20V and FIG. 10f $V_{in}$=16V. The lens profiles are taken under three different wavelengths: 633 nm, 514 nm, 488 nm to verify the effect on axial chromatic aberration.

Figure 11:
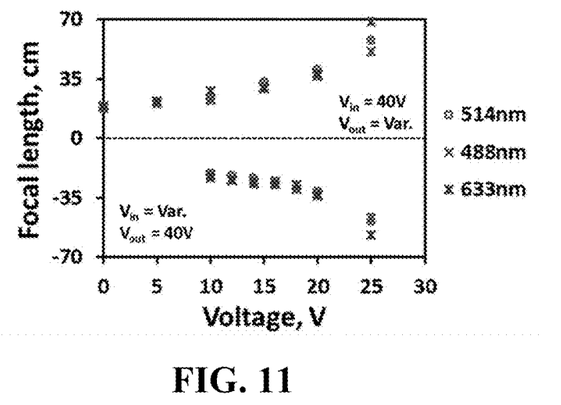
FIG. 11 shows a graph of focal length as a function of applied voltage measured at different wavelengths, indicating an electrically-tunable focal length. In the graph, the upper half: $V_{in}$ is fixed at 40V with varying $V_{out}$ for positive lens operation, while lower half: $V_{out}$ is fixed at 40V with varying $V_{in}$ for negative lens operation.
Figure 12A:
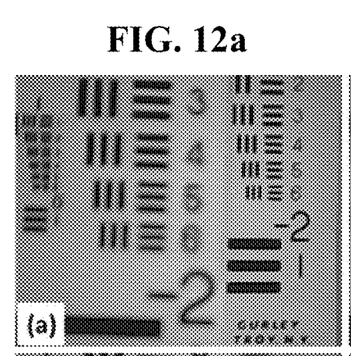
FIG. 12a is for a positive lens, off-state ($V_{in}$=40V, $V_{out}$=40V)
Figure 12B:
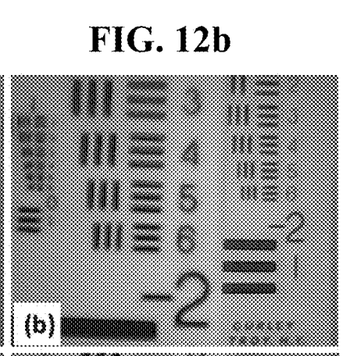
FIG. 12b is for a positive lens, on-state ($V_{in}$=40V, $V_{out}$=0V)
Figure 12C:
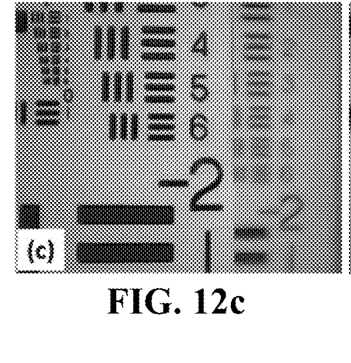
FIG. 12c is for a negative lens, off-state ($V_{in}$=40V, $V_{out}$=40V)
Figure 12D:
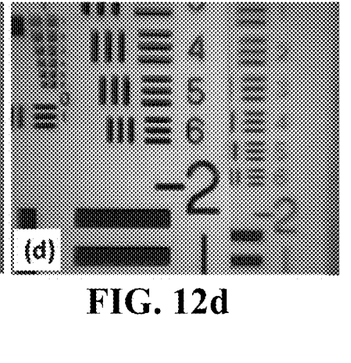
FIG. 12d is for a negative lens, on-state ($V_{in}$=10V, $V_{out}$=40V).

The devices of the invention provide a tunable focal length as may be desired for many applications. FIG. 11 shows the plots of electrically tunable focal length as a function of applied voltages measured at different wavelengths for both the positive and negative lenses in the example of lens 50. The upper half of plot in FIG. 11 is the positive tuning of the liquid crystal lens 50 and the lower half of plot in FIG. 11 is the negative tuning. The positive lens is operated when $V_{in}$ is fixed at 40V and $V_{out}$ is varying. The effect of suppressed wavelength dispersion appears when $V_{out}$ is from 0V to 20V in this example, and for such an example, the tunable focus range for positive lens is from 18 cm to 40 cm. The negative lens is operated when $V_{out}$ is fixed at 0V and $V_{in}$ is varying. The effect of suppressed wavelength dispersion appears when $V_{in}$ is from 10V to 20V in this example, and for such an example, the tunable focus range for negative lens is from −22 cm to −32 cm.

For the example 50, the image qualities of both the positive lens and negative lens are presented in FIG. 12. In this example, a liquid crystal lens 50 is attached onto a webcam (Logitech C920) with the aperture of lens 50 aligned with the camera. The target on the left hand side in each picture is defined as target 1 with d1 as the distance to the liquid crystal lens/webcam. The target on the right hand side in each picture is defined as target 2 with $d_2$ as the distance to the liquid crystal lens/webcam. In this setup, d1 is shorter than $d_2$. The positive lens effect is presented in FIGS. 12a and 12b. The web cam is set at manual mode without automatic adjustment on focusing and lighting. In FIGS. 12a and 12b, d1 is set at 19 cm and $d_2$ is set at 75 cm with the initial focusing point of the webcam set at target 2. Without lens effect, target 1 is not focused as shown in FIG. 12a. With the positive lens effect, the image on target 1 becomes clear as shown in FIG. 12b. To demonstrate the imaging quality in negative lens tuning, target 1 is set at 19 cm and target 2 is set at 65 cm, and the initial focusing point is set at target 1 as shown in FIG. 12c. With the negative lens effect, the image on target 2 comes into focus as seen in FIG. 12d. In this example, FIG. 12a shows a positive lens in the off-state ($V_{in}$=40V, $V_{out}$=40V), while FIG. 12b showing a positive lens on-state ($V_{in}$=40V, $V_{out}$=0V). In this example, FIG. 12c shows a negative lens in the off-state ($V_{in}$=40V, $V_{out}$=40V), while FIG. 12d showing a negative lens on-state ($V_{in}$=10V, $V_{out}$=40V).

The proposed achromatic microlens or other lens array, including a three-electrode lens example, using chiral nematic liquid crystal with a twisted vertical alignment, are described, but the use of the methods and device examples extend to use in the variety of devices and applications as noted. These include forming the cells of the invention into arrays, which may then be used in digital projection or projectors, including full-color 3D projection for virtual reality (VR) applications, microscopy, endoscopy or pico projection and various other applications. Additional applications of such arrays include digital/optical zoom lenses, 3D or other imaging and sensor systems, electrically switchable 2D/3D mode projection or imaging, beam steering, homogenizing or shaping, fiber coupling, light-field microscopy and many other applications. The provision of LC cells using a chiral nematic liquid crystal material in a twisted vertical alignment configuration, operates (switches between states) at low-voltage and which is wavelength-independent and has an electrically tunable focal length. The devices and methods also provide suppressed wavelength dispersion in the display, imaging, ophthalmic, endoscopic or other type of device, to minimize color or other distortions or aberrations.

The examples are described with reference to a particular devices and methods according to the invention, but different embodiments for different applications and/or environments are contemplated. Obviously, modifications and alterations within the scope of the invention will occur to others upon reading and understanding the preceding description. It is intended that the invention be construed as including all such modifications and alterations insofar as they come within the scope of the appended claims or the equivalents thereof.

What is claimed is:

1. A liquid crystal optical device comprised of:
   at least first and second substrates that are spaced apart from one another at a predetermined distance, each of the first and second substrates having inner and outer surfaces, and defining a cell thickness between the inner surfaces;
   at least a first electrode disposed on a surface of the first substrate, and at least a second electrode disposed on a surface of the second substrate, wherein at least one of the first or second electrodes is patterned on the first or second substrate;
   a first alignment layer disposed on said first substrate and a second alignment layer on said second substrate;
   a layer with high resistivity disposed between the areas of the patterned electrode on at least one of the first or second substrate;
   a chiral nematic liquid crystal material in a twisted vertical alignment configuration interposed between the substrates, with the chiral nematic liquid crystal molecules being of negative dielectric anisotropy;
   wherein the at least first and second electrodes are connected to a voltage source to drive the liquid crystal molecules between at least first and second states, wherein the first and second alignment layers together cause alignment of the liquid crystal molecules to be substantially perpendicular to the first and second substrates without voltage applied and in a twisted nematic structure with voltage applied, wherein the source of voltage applies at least a first voltage to a portion of the patterned electrode on at least the first or second substrate and a second voltage to a different portion of the patterned electrode on at least the first or second substrate to vary the electric field formed inside the cell according to the configuration of the patterned electrode and applied at least first and second voltages to portions of the patterned electrode.

2. The device of claim 1, wherein the first and second alignment layers are aligned in an anti-parallel fashion.

3. The device of claim 1, wherein the first and second alignment layers are vertical alignment layers that are treated to provide anisotropy and small pretilt angle in the chiral nematic liquid crystal molecules.

4. The device of claim 1, wherein at least one further substrate is positioned relative to the first and second substrate at a predetermined separation from one of the first or second substrates, with the at least one further substrate having at least one further electrode, and wherein the voltage source applies voltage to the at least one further electrode in cooperation with the voltages applied to the first and second electrodes.

5. The device of claim 1, wherein the device is a liquid crystal lens device and the first, second and at least one further substrate each have inner and outer sides and the at least one of the first or second electrodes that is patterned is provided on the outer side of the second substrate and the alignment layer is provided on the inner side of the second substrate, and the at least one further substrate is positioned in spaced relation to the second substrate and having an electrode, wherein voltage is applied to the electrodes on the first, second and at least one further substrate to produce desired lens effects.

6. The device of claim 1, wherein the ratio between the cell thickness and pitch of the chiral nematic liquid crystal material (d/p) is controlled to provide a predetermined phase difference between center and edge of the device in response to an applied voltage.

7. The device of claim 1, wherein the ratio between the cell thickness and pitch of the chiral nematic liquid crystal material (d/p) is controlled to provide an output polarization state that is closed to the input linear polarization direction.

8. The device of claim 1, wherein the ratio between the cell thickness and the chiral pitch of the cholesteric liquid crystal is fixed at about 0.4 to 0.6.

9. The device of claim 8, wherein the ratio between the cell thickness and the chiral pitch of the cholesteric liquid crystal is fixed at about 0.5±0.05.

10. The device of claim 1, wherein the liquid crystal material includes an amount of at least one reactive monomer that is polymerized to produce a polymer stabilized twist vertically aligned structure in the liquid crystal molecules.

11. The device of claim 1, wherein the device is a liquid crystal lens device and the at least first and second electrodes together create a parabolic electric field for producing both positive and negative lens effects.

12. The device of claim 1, wherein the patterned electrode is disposed on the outer surface of the first or second substrate to drive the liquid crystal molecules in the cell between the at least first and second states.

13. The device of claim 1, wherein the patterned electrode on at least the first or second substrate and the at least first and second voltages applied to the portions of the patterned electrode configure the device as a liquid crystal lens device that produces both a positive lens effect and a negative lens effect, and the voltage driving scheme applies both the at least first and second voltage with an approximately equal voltage to suppress defects during switching of the liquid crystal molecules between the at least first and second states.

14. A liquid crystal device comprising:
a first substrate that is spaced apart from a second substrate by a predetermined distance, each substrate having inner and outer surfaces and defining a cell thickness between the inner surfaces;
a first electrode disposed on the inner surface of the first substrate;
a second electrode disposed on the outer surface of the second substrate;
a vertical alignment layer disposed on the inner surfaces of each of the first and second substrates;
a liquid crystal interposed between the substrates, the liquid crystal comprising chiral nematic liquid crystal molecules of negative dielectric anisotropy; and
at least one further electrode spaced apart from the second substrate by a predetermined distance by a transparent material, wherein the first, second and at least one further electrode have predetermined voltages applied to them to produce lens effects.

15. The device of claim 14, wherein the vertical alignment layer on said first and second substrates are aligned in an anti-parallel fashion.

16. The device of claim 14, wherein the vertical alignment layer on said first and second substrates are treated to provide anisotropy and small pretilt angle.

17. The device of claim 14, wherein the ratio between the cell thickness and pitch of the chiral nematic liquid crystal material (d/p) is controlled to provide a predetermined phase difference between center and edge of the device in response to an applied voltage.

18. The device of claim 14, wherein the ratio between the cell thickness and the chiral pitch of the chiral nematic liquid crystal material is fixed at about 0.5±0.05.

19. A method of producing lens effects in a liquid crystal device, comprising
forming a liquid crystal cell having at least first and second substrates that are spaced apart from one another a predetermined distance, with each of the first and second substrates having inner and outer surfaces;
forming at least a first electrode disposed on a surface of the first substrate, and at least a second electrode disposed on a surface of the second substrate, wherein at least one of the first or second electrodes is patterned on the substrate with electrical resistance between the patterned electrode portions;
interposing a chiral nematic liquid crystal material of negative dielectric anisotropy between the first and second substrates, to form a twisted vertical alignment mode in the thickness of a liquid crystal cell;
causing homeotropic alignment of the liquid crystal molecules between the first and second substrates without voltage applied to the at least first and second electrodes; and
applying a voltage to the at least first and second electrodes to drive the liquid crystal molecules between at least first and second states to cause lens effects.

20. The method of claim 19, further comprising setting the ratio between the cell thickness and the chiral pitch of the chiral nematic liquid crystal at about 0.4 to 0.6.

* * * * *